US007190379B2

(12) United States Patent
Nissen

(10) Patent No.: US 7,190,379 B2
(45) Date of Patent: Mar. 13, 2007

(54) METHOD FOR RESIZING AND MOVING AN OBJECT ON A COMPUTER SCREEN

(75) Inventor: Peter Nissen, Frederiksberg (DK)

(73) Assignee: Contex A/S, Alleroed (DK)

( * ) Notice: Subject to any disclaimer, the term of this patent is extended or adjusted under 35 U.S.C. 154(b) by 329 days.

(21) Appl. No.: 10/184,070

(22) Filed: Jun. 28, 2002

(65) Prior Publication Data

US 2003/0001869 A1    Jan. 2, 2003

(51) Int. Cl.
*G09G 5/00* (2006.01)
(52) U.S. Cl. ..................................... 345/660
(58) Field of Classification Search ................ 345/660, 345/661, 666, 788, 800, 856
See application file for complete search history.

(56) References Cited

U.S. PATENT DOCUMENTS

| | | | | |
|---|---|---|---|---|
| 4,755,811 A | * | 7/1988 | Slavin et al. | 345/668 |
| 4,817,172 A | * | 3/1989 | Cho | 382/198 |
| 5,119,079 A | * | 6/1992 | Hube et al. | 345/823 |
| 5,263,134 A | * | 11/1993 | Paal et al. | 345/788 |
| 5,396,590 A | * | 3/1995 | Kreegar | 345/808 |
| 5,513,309 A | * | 4/1996 | Meier et al. | 345/860 |
| 5,568,600 A | * | 10/1996 | Kaba | 345/648 |
| 5,570,462 A | * | 10/1996 | McFarland | 345/648 |
| 5,594,471 A | * | 1/1997 | Deeran et al. | 345/173 |
| 5,596,346 A | * | 1/1997 | Leone et al. | 345/667 |
| 5,600,765 A | * | 2/1997 | Ando et al. | 345/668 |
| 5,689,284 A | * | 11/1997 | Herget | 345/661 |
| 5,729,255 A | * | 3/1998 | Aoki | 345/723 |
| 6,047,130 A | * | 4/2000 | Oles | 396/1 |
| 6,052,110 A | * | 4/2000 | Sciammarella et al. | 345/661 |
| 6,075,531 A | * | 6/2000 | DeStefano | 345/788 |
| 6,226,400 B1 | * | 5/2001 | Doll | 382/163 |
| 6,407,747 B1 | * | 6/2002 | Chui et al. | 345/660 |
| 6,407,749 B1 | * | 6/2002 | Duke | 345/684 |
| 6,493,003 B1 | * | 12/2002 | Martinez | 345/781 |
| 6,608,631 B1 | * | 8/2003 | Milliron | 345/647 |
| 6,642,936 B1 | * | 11/2003 | Engholm et al. | 345/661 |
| 2002/0149605 A1 | * | 10/2002 | Grossman | 345/660 |

* cited by examiner

*Primary Examiner*—Ryan Yang
(74) *Attorney, Agent, or Firm*—Harness, Dickey & Pierce P.L.C.

(57) ABSTRACT

A method for defining the size of an object displayed on a computer screen, the computer screen having a matrix of sensor points, said method comprising the steps of displaying an object on a computer screen, defining at least one screen area having a reference point associated therewith, reading an input from a sensor point in a screen area, calculating a vector between the read input and the reference point of that screen area, and defining the size of the object based on the vector.

22 Claims, 2 Drawing Sheets

METHOD FOR RESIZING AND MOVING AN OBJECT ON A COMPUTER SCREEN

FIELD OF THE INVENTION

The present invention relates to a method for resizing an object to be displayed on a computer screen such as a touch screen.

BACKGROUND OF THE INVENTION

Touch screens are more and more commonly used for various computer applications and for office machines such as copy machines, fax machines, graphical scanners etc. Typically a touch screen takes the place of a normal computer screen, a keyboard and/or optional peripheral equipment such as a pointing device in the form of a mouse or a track ball. In addition to the ability of displaying an image, a touch screen has a matrix with a plurality of sensitive points defined on the surface of the screen. By touching a point on the screen, the absolute position of the point on the screen being touched is registered and transmitted to the controlling CPU. This is similar to pressing a mouse button where the absolute position of a cursor is registered.

When defining a relative position or a movement of an item e.g. when dragging and dropping items on the screen, the mouse button is typically kept depressed while the cursor is moved from one position on the screen to a new position on the screen. The desired result, be that a vector defining the change in the size of the item or a vector defining the distance and direction of the movement of the item, is defined from the start point, at the time when the mouse button is depressed, to the end point, when the mouse button is released. Since applications using touch screens typically has no conventional pointing devices, such as a mouse or trackball, a similar user interface may be difficult to achieve. Applications exist wherein the start point is defined as the point a user touches the screen and by keeping the finger in contact with the screen, the user may move the finger to the end point where the finger is removed from the screen. However, it is typically an awkward process to move a finger in firm contact with a screen and due to the sensitivity of common touch screens, the above mentioned user interface for defining a relative position or movement on a screen is not suitable for many applications. As an example, the user may often have to press relatively hard against the surface of the screen in order to activate the sensitive areas of the screen and it is difficult at one time both to press hard against the screen and move the finger across the screen.

DESCRIPTION OF THE INVENTION

It is an object of the present invention to overcome the above described disadvantage of the known user interfaces by providing a method for defining the size of an object displayed on a computer screen, the computer screen having a matrix of sensor points, said method comprising the steps of:
  displaying an object on a computer screen,
  defining at least one screen area having a reference point associated therewith,
  reading an input from a sensor point in a screen area,
  calculating a vector between the read input and the reference point of that screen area, and
  defining the size of the object based on that vector.

The object which is going to be resized may as an example be a picture or picture frame, text or a text frame or any other object being visualized on a computer screen. The computer screen may be a regular computer screen, even though the following description focuses on a touch screen. The computer screen may also be a window on a computer screen.

Sensor point are points on the screen selected by the user, either by mouse-clicking on the computer screen, by touching the screen or in any other way by selecting a point on the screen.

Screen Area is a predefined area of the screen. Sensor points sensed within one particular screen area are used for one particular resizing direction.

As an example, the object could be a quadrangular frame, e.g. defining the borders of a graphical image. When a user wants to define the borders of the graphical image, e.g. when framing a digital photo, the size of the frame is defined and the frame is positioned in relation to the photo so that the desired part of the photo is encapsulated by the frame. For this purpose, a method for the resizing of the frame according to the present invention is highly advantageous. Preferably 8 screen areas are defined outside the quadrangle, the 8 screen areas defining 8 directions of enlargements of the size of the quadrangle (North, North-East, East, East-South, South, South-West, West and West-North). Additional at least 4 screen areas are defined inside the quadrangle, the 4 screen areas defining 4 directions of reduction of the size of the quadrangle (North, East, South and West). Accordingly the user will be provided with very easy means of defining the right size of the frame by clicking only once on the screen.

The screen area(s) could be visualized on the screen as an image, e.g. overlapping the object and defining a certain area or areas of the screen and thus defining specific sensor points in the matrix of sensor points. Taking the above example of a quadrangle, it will be appreciated to visualize the areas defining the 4 directions of reduction, e.g. by drawing two lines, each line connecting two opposite corners of the quadrangle, the two lines thus forming a cross inside the quadrangle. The 8 areas defining the 8 directions of enlargement could be visualized simply by extending both ends of each of the 4 lines defining the quadrangle. This has been shown in FIG. 2.

The object being resized is thus accomplished by a number of areas constituting "push areas". When a sensor point senses a touch within one screen area, the reference point of that screen area is used, together with the absolute position of the sensor point (or the position of the sensor point relative to the reference point) to generate a two dimensional vector, i.e. a direction of resizing and a dimension of the resizing. The vector is subsequently used to resize the object, e.g. the quadrangular frame. If the screen is a regular computer screen, the sensor point would be the point on the screen at which the pointer or cursor points.

The vector, which is defined from the reference point and the sensor point, determines a direction of resizing and a degree of resizing. As an example, the vector is determined directly from the direction and distance from the reference point to the sensor point from which an input has been read. As another example, the vector is determined from the projection of the above mentioned direction and distance from the reference point to the sensor point onto either a horizontal or vertical axis or onto an axis of a predetermined direction. As an example, a quadrangular frame may be resized in the way that one of the sides of the quadrangle, or that side of the quadrangle being nearest the sensor point from which an input has been read, is simply moved to the sensor point from which an input has been read.

Preferably the invention is combined with a drag object operation. Since the screen area refers to a reference point, a drag operation (click-drag-release) anywhere within the screen area can effectively be interpreted as a drag operation of the reference point. I.e. keeping the vector (or projection of the vector) fixed and thereby resizing the object.

The differentiating between a dragging or just clicking operation is easily defined by setting a limit in pixels on the pointing device movement while the mouse button or touch screen is depressed.

The differentiation could further or alternatively be defined by having a time evaluation of the activation/depression of the screen area. As an example, only activation of the area for less than 1 (one) second would result in a clicking operation while longer presses would result in a dragging operation. Typically, the click operation is more drastic in effect than the dragging, and this differentiation therefore further prevents unintentional clicking.

Preferably, the object is resized by moving a predetermined part of the object from a first position to a second position, the vector connecting the first and the second positions or the vector at least extends in a direction from the first position to the second position. As an example, a small quadrangle is visualized in the middle of a screen. Upon reading an input from a sensor point located near one of the borders of the screen, the side of the quadrangle being nearest the sensor point is moved $1/1$st, $1/2$nd, $1/3$rd, $1/4$th, $1/5$th, $1/6$th, $1/7$th, $1/8$th, $1/9$th, $1/10$th or even less than $1/10$th of the distance in the direction towards the sensor point.

Preferably, the reading of an input from a sensor point in a screen area is repeated periodically, e.g. every $1/10$th, $1/9$th, $1/8$th, $1/7$th, $1/6$th, $1/5$th, $1/4$th, $1/3$rd, $1/2$nd, $1/1$ sec. or even with a lower frequency. Every time an input from a sensor point is read, the size of the object may be changed according to the above described procedure for the resizing of the object, e.g. the object may every $1/10$th of a sec. be resized $1/10$th of the distance from the reference point to the sensor point.

In order to give the user a positive feel for the resizing of objects, the degree of resizing may be tuned either manually or automatically. As an example, the user may select a number from one to five, the number being indicative of the resizing impact. By selecting one, the object will only be slightly larger even though the user touches a point relatively far away from the object. By selecting five, the same touch point will enlarge the object by the full distance from the reference point to the sensor point. As an example of automatically tuning of the resizing, the degree of resizing may be determined from the size of the object relative to the size of the screen or relative to the size of an active window used for displaying the object.

As yet another example, the degree of resizing may be determined from the position of a reference image visualized on the screen. Other references for the automatic tuning of the resizing function may be chosen.

Taking the above example of a quadrangular frame, it will be appreciated that the reference points are defined so that whenever a user touches a sensor point on the touch screen, the quadrangular frame is resized so that the nearest side of the quadrangle or nearest corner of the quadrangle intersects that sensor point. The remaining corners and lines should remain unchanged in their respective positions on the touch screen whereby the size of the quadrangle is changed.

Preferably the reference points are visualized on the screen so that the user can visually see which point is being used for calculation of the resizing. As an example one corner of the screen always defines the reference point and as the user touches the screen in order to resize the object, the distance and direction between the touch point and this reference point is calculated for resizing and visualizing the resized object.

As another example a sharp corner point of the object may define the position of the reference point and as yet another example, the user may point on the screen to first define the reference point, succeedingly the user may point on the screen to define the resizing of the object.

If the screen comprises more than one object the user may be invited to point out individual objects which are going to be resized, either by keying in a reference name or number of the object or simply by "clicking" out the object on the screen.

According to another aspect, the present invention relates to a graphical scanner for scanning images and to a way of manipulating the scanned images, the scanner being provided with a graphical touch screen user interface and a CPU adapted to enable the above mentioned user interaction for resizing an object. Via the user interface, the user may define the size of a frame within a scanned image. The frame could as an example define an area, which is to be rescanned with a higher resolution, an area which is to be rescanned with specific settings of the scanner or a frame comprising a picture which is to be exported as a graphical object, e.g. to a color printer for printing.

According to yet another aspect, the present invention relates to a copy machine for scanning and printing images, the copy machine being provided with a graphical touch screen user interface and a CPU adapted to enable the above mentioned user interaction of resizing a frame, hereby selecting a part of the scanned image to be printed.

Finally it should be understood that the above-described method of resizing an object or frame could be used together with a regular screen instead of a touch screen. In that case the position of a screen cursor on the screen should be controlled via traditional pointing devices such as a mouse, a trackball, a light pen or a digitizer etc. The position of the cursor in that case takes the place of the position where the user touches the screen and the user would need to indicate the point by clicking a mouse button or in a similar way to indicate that the position is to be used for the resizing.

DETAILED DESCRIPTION OF THE INVENTION

An embodiment of the invention will now be described in details with reference to the drawing in which.

Figure 1:
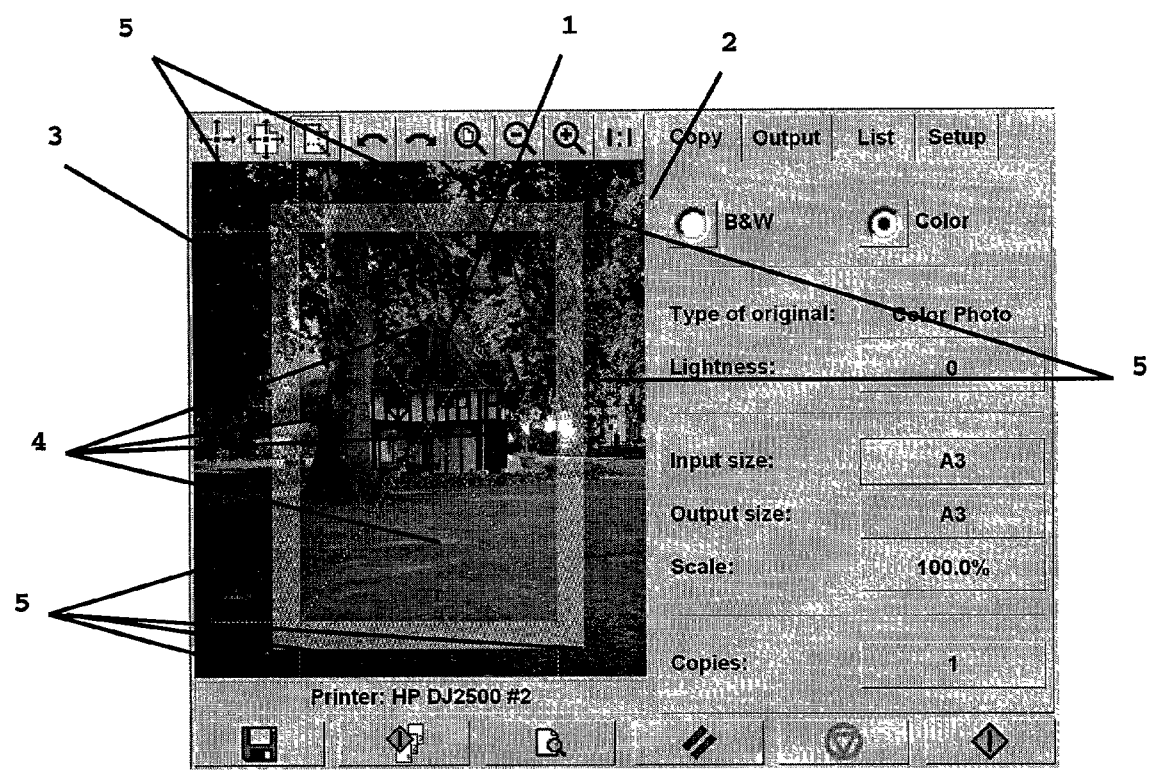
FIG. 1 shows an object visualized on a computer touch screen.

Now referring to FIG. 1, the invention relates to an Image Window Tool in the following text referred to as an Object Resize tool. The tool allows for graphical interactive resizing of an object 1 e.g. shown in an Image Window 2. The tool may be programmed in any language and for any computer platform.

As an example, the Object Resize tool can be implemented as a tool in an application capable of retrieving and displaying raster images. The application, including the tool, can be written in Microsoft Visual C++™, and the target platform can be any of the Microsoft Windows™ operating system (O/S) platforms. In this example, the tool will then be using the graphical capabilities of the Microsoft Windows™ Application Programming Interface (API) to display the tool. This involves obtaining a graphical device context (DC) from the API, and writing the appropriate commands to this DC, to have the O/S display the tool. Similar operations are used for displaying and updating any graphical elements related to the tool (e.g. an underlying raster image).

The Object Resize tool can be programmed as a part of a Windows™ application or it can be programmed as a separate Microsoft COM component (Component Object Model). The advantages of a separate implementation are easier reusability e.g. in multiple applications and a programmatically nicer and cleaner solution. Where the main application typically would be programmed in C++ with the use of the MFC programming library (Microsoft Foundation Classes), the separate COM component would typically be programmed in C++ with the use of the Microsoft ATL library (Active Template Library). The typical touch screen input device uses a mouse hardware interface (COM, PS/2 or USB), and with the supplied driver, this device acts like any other mouse device in the operating system. I.e. touching the screen will generate mouse events in the Windows™ O/S, and the touches done on a visible part of the Window showing the Object Resizing tool, will cause mouse events to be send to the application.

Figure 2:
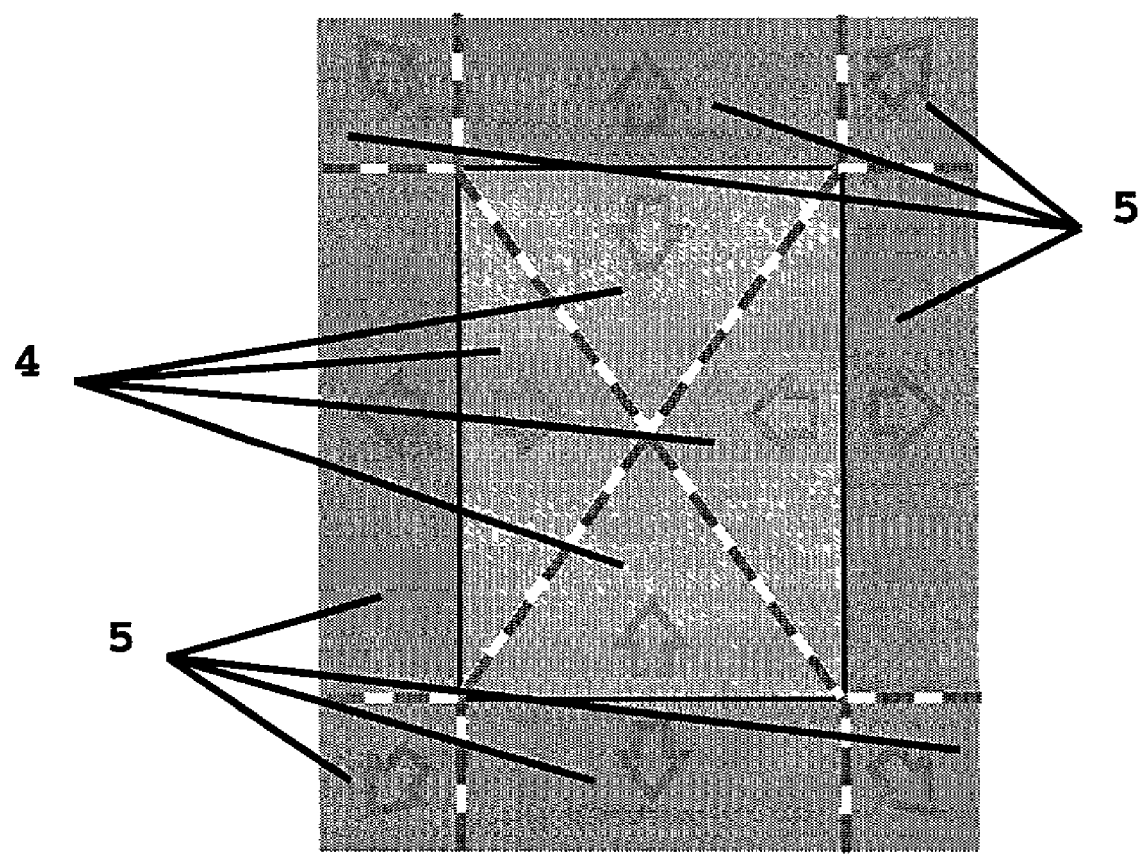
FIG. 2 shows a view of screen areas for the resizing of the object of FIG. 1.

The Object Resize tool works on a predefined part 3 of the window. The predefined part is divided into 12 screen areas 4,5—also shown in FIG. 2. The screen areas define four directions (4) for the size reduction of the object and eight directions for the enlargement (5) of the object. The borders between the screen areas are drawn in a stylistic form, see also FIG. 2; the arrows are explanatory and does not necessarily have to be shown in the Image Window.

When activating the tool, an "X" is graphically shown inside the Paper Frame 3 on the computer screen. Furthermore, a horizontal and vertical line extending from each corner of the Paper Frame towards the perimeter of the Image Window ('L' shaped') is shown.

These lines create four regions inside the Paper Frame, and eight regions outside the Paper Frame. As illustrated with the arrows, these regions are tied two regions to each side of the Paper Frame, and one corner-region to each corner of the Paper Frame.

The Object Resize Tool may be operated by dragging and dropping but according to the invention "Centre-clicking" as described below, is preferred.

Dragging
  The Paper Frame side, respectively corner, tied to the clicked region is moved according to the dragged distance.
Centre-clicking
  The Paper Frame side, respectively corner, tied to the clicked region is placed at the clicked position of the image in the Image Window.

The Object Resize of an object (i.e. resizing based on specified region as opposed to a resize based on a specified border), can be applied in numerous applications.

The Object(s) Beneath the Tool.
  The basic purpose of the rectangular frame is to select or point-out a part of a layout. This layout is displayed in the same screen element as the rectangle can be interacted on (the Image Viewer), and in a way so that the rectangle (when active) is drawn 'on top' of the layout. The layout can consist of different component(s):
  A raster image
  A graphical document consisting of a mixture of
    raster images
    vector graphic objects
    text Basically all types of visual objects which can be shown on a 2 dimensional computer screen in a rectangular or differently shaped window that sets the outer perimeter of the tool's regions.

The Frame.
  The rectangle itself can be drawn as a thin line (no border thickness) or as two rectangles inside each other (a rectangle with a border thickness). For the purpose of e.g. illustrating a margin.
  In the case of two combined rectangles, the inter-placement or relationship between them can be defined in different ways:
    It can be a fixed distance between the sides (different for each side).
    A function depending on the rectangles size or position relative to the image (or other involved objects) or relative to the Image Viewer.
    In the case of two combined rectangles the gap between them can optionally be filled with a color or pattern.
  In the case of two combined rectangles it is optional whether it is the inner or outer rectangle that is active, and being adjusted. The passive rectangle will follow the active rectangle, in the way they are related.

The Regions.
  The perimeters of the regions (i.e. the 'X' and 'L's) may preferably be drawn in the image, e.g. with an option for the user to make them invisible.
  The Object Resize can optionally be combined with the conventional Windows resizing way of placing the mouse cursor on the Paper Frame and dragging. The Image Window includes this feature as part of the Object Resize implementation, and uses the conventional arrow cursors in these positions.
  Actually these two resizing methods combine beautifully in the sense that the dragging operation of the Object Resize is comparable to the conventional mouse dragging, only with a more complex definition of the active region. The Object Resize furthermore adds the centre-click functionality via the defined regions.

The invention claimed is:

1. A method for defining the size of an object displayed on a computer screen, the computer screen having a matrix of sensor points, said method comprising:
  displaying an object on the computer screen,
  defining at least one resizing screen area having a reference point associated and correlated therewith, the reference point being a predetermined point provided to be used to define a direction of resizing and a degree of resizing of the object,
  providing a resizing of the object by selecting the resizing screen area,
  reading an input from a matrix of sensor points in the resizing screen area, the inputted sensor point being user defined,
  defining a vector, wherein the vector is defined from the reference point and the sensor point which determines a direction of resizing and a degree of resizing, and
  displaying a resized object on the computer screen so that the resized object is displayed upon reading said input in the resizing screen area.

2. A method according to claim 1, wherein the computer screen is a touch screen and wherein the sensor points correspond to sensor points of the touch screen.

3. A method according to claim 1, wherein the reference point is a corner point of the screen.

4. A method according to claim 1, wherein the reference point is a point defined by the shape of the object.

5. A method according to claim 1, wherein the reference point is visualized on the screen.

6. A method according to claim 1, wherein the border of the screen area is defined by a raster image.

7. A method according to claim 1, wherein the border of the screen area is defined by a vector graphic object.

8. A method according to claim 1, wherein the border of the screen area is defined by a text field.

9. A method according to claim 1, wherein the object is a raster image.

10. A method according to claim 1, wherein the object is a vector graphic object.

11. A method according to claim 1, wherein the object is a text field.

12. A method according to claim 1, wherein the object is a frame for framing an image.

13. A method according to claim 1, wherein the direction of the vector is determined as the direction from the reference point to the sensor point from which an input has been read.

14. A method according to claim 1, wherein the object is resized by moving a predetermined part of the object from a first position to a second position, the vector connecting the first and the second positions.

15. A method according to claim 1, wherein the object is resized by moving a predetermined part of the object from a first position to a second position, the vector extending in a direction from the first position to the second position.

16. A method according to claim 1, wherein the reading of an input from a sensor point in a screen area is repeated periodically.

17. A method according to claim 16, wherein the object, upon reading an input for the sensor point, is periodically resized by moving a predetermined part of the object from a first position to a second position, the vector extending in a direction from the first position to the second position.

18. The method according to claim 1, wherein the definition of the size is combined with a drag object operation wherein the length of the vector and accordingly the size of the object is fixed while the object is moved.

19. A system for presentation of images, the system comprising a screen with a plurality of sensitive points and a processor for processing input from the sensitive points, the processor being adapted to process the input in accordance with the method for defining the size of the object according to claim 1.

20. A scanner for scanning images and comprising an operator interface with a screen and a processor, the processor being adapted to process input from the screen in accordance with the method for defining the size of the object according to claim 1.

21. A method according to claim 1, wherein the object is a quadrangular frame and wherein the reference point is defined so that a user touching the sensor point on the computer screen is providing a resizing of the quadrangular frame so that the nearest side of the quadrangle or nearest corner of the quadrangle intersects the sensor point.

22. A method according to claim 21, wherein the remaining corners and lines remain unchanged in their respective positions on the computer screen whereby the size of the quadrangle is changed.

* * * * *